July 30, 1968    J. D. WILSON    3,395,207
METHOD OF REDUCING DISSIPATION FACTOR OF POLYPHENYLENE OXIDE
Filed Sept. 6, 1966
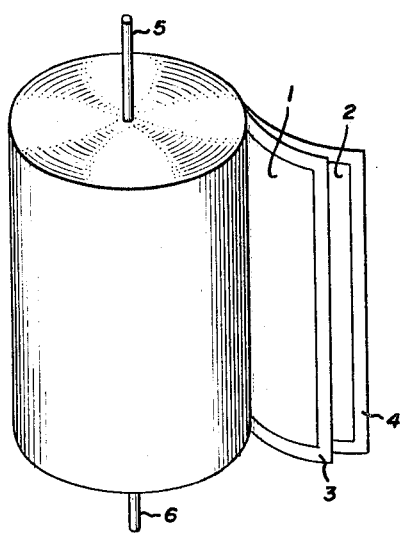
FIG.1.
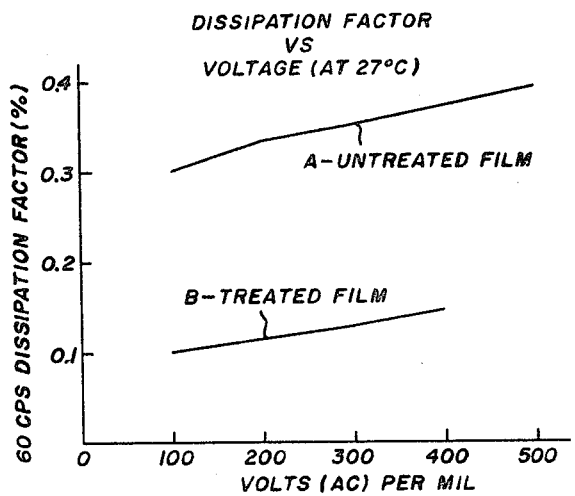
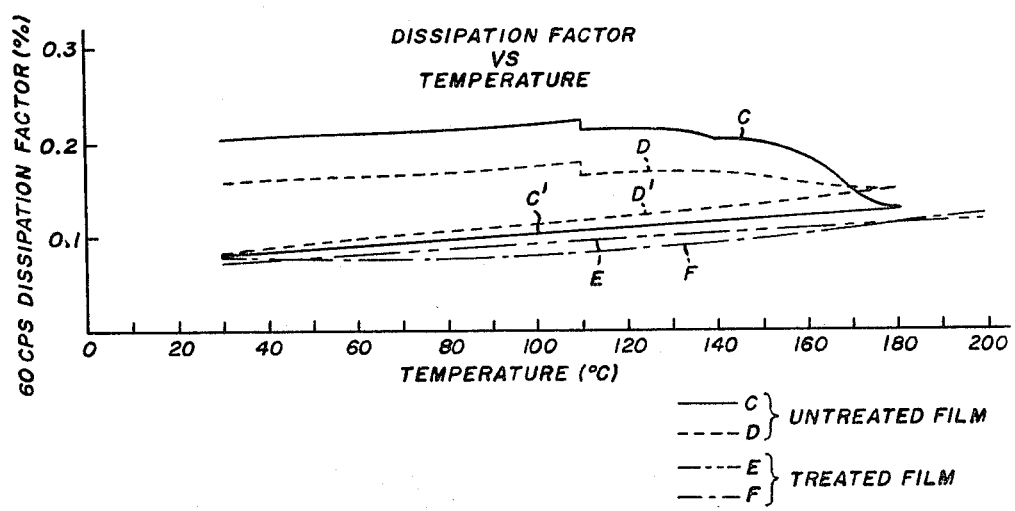
INVENTOR:
JERRY D. WILSON,

United States Patent Office 3,395,207
Patented July 30, 1968

3,395,207
METHOD OF REDUCING DISSIPATION FACTOR OF POLYPHENYLENE OXIDE
Jerry D. Wilson, Conesville, Ohio, assignor to General Electric Company, a corporation of New York
Filed Sept. 6, 1966, Ser. No. 577,295
3 Claims. (Cl. 264—234)

ABSTRACT OF THE DISCLOSURE

Polyphenylene oxide film produced from a chlorine containing solvent casting process for capacitor use may have its dissipation factor reduced by heat treating the film to drive off residual amounts of solvent, and particularly to reduce the chlorine content of the film.

---

This invention relates to a method of preparing solvent-cast polyphenylene oxide dielectric material, and more particularly to a method of improving the dielectric properties of solvent-cast polyphenylene oxide film and to the electrical capacitors using such improved films.

The recent development of polyphenylene oxide and subsequent experiments therewith have shown that various polyphenylene oxide films are useful as dielectric materials. One measure of a material's suitability as a dielectric material is its power loss, i.e., the power loss observed when the material has a voltage imposed on it. One parameter for recording this power loss is dissipation factor percent which, as used herein, is $$100 \times \text{tangent } \delta$$

where $\delta = 90° - \theta$
and $\theta$=phase angle between current and voltage.

The dissipation factor of polyphenylene oxide films has been found to remain relatively low even at temperatures above 100° C. However, conventional solvent-casting processes, which are particularly desirable methods of forming polyphenylene oxide films, produce films with a relatively high dissipation factor, in the range of from .1% to over .2%, and with a rather high variation in dissipation factor at various voltages and temperatures. As a result, conventional solvent-cast polyphenylene oxide dielectric films have been inferior to those produced by other processes.

It is therefore an object of this invention to provide a polyphenylene oxide dielectric material having a relatively low dissipation factor.

It is another object of this invention to provide a polyphenylene oxide dielectric material having a dissipation factor which remains relatively constant despite variation in temperature of the film or voltage imposed across the film.

It is also an object of this invention to provide a method for improving the dielectric properties of solvent-cast polyphenylene oxide film.

It is a further object of this invention to provide a method for producing solvent-cast polyphenylene oxide film particularly suitable for use in electrical capacitors due to the film's low dissipation factor and the relatively small voltage and temperature dependency of the film's dissipation factor.

One other object of this invention is to provide an improved electrical capacitor including a solvent-cast polyphenylene oxide film as its dielectric spacer material.

Briefly, these objects may be met, in accordance with one aspect of this invention, by heating solvent-cast polyphenylene oxide film to a relatively high temperature after the film has been otherwise formed and dried by conventional methods.

While the specification concludes with claims particularly pointing out and distinctly claiming the subject matter of the present invention, it is believed that the invention will be better understood from the following description taken in conjunction with the accompanying drawing in which:

FIGURE 1 illustrates an electrical capacitor incorporating an improved dielectric material produced in accordance with the present invention;

FIGURE 2 graphically illustrates the relationship between the voltage imposed across a polyphenylene oxide film made in accordance with this invention and the dissipation factor of that film;

FIGURE 3 graphically illustrates the relationship between the temperature of a polyphenylene oxide film made in accordance with this invention and the dissipation factor of that film.

Referring more specifically to FIGURE 1 there is shown a capacitor assembly comprising a roll-type capacitor which includes a pair of convolutely wound electrode foils 1 and 2 of suitable metal, such as aluminum, insulated from each other by separate films 3 and 4 of polyphenylene oxide dielectric film treated in accordance with the present invention. More specifically, this film is a solvent-cast polyphenylene oxide which has been heated to substantially above its normal drying temperature for a short time to remove residual solvent. A pair of terminal leads 5 and 6 are electrically connected to respective electrodes 1 and 2 and project from opposite ends of the wound capacitor.

Alternatively, a capacitor may be formed, within the scope of the present invention, by the deposition of metallic coatings, by conventional metallization processes, on the surfaces of a treated solvent-cast polyphenylene oxide film. These metallic coatings may serve as capacitor electrodes in lieu of electrode foils 1 and 2 in FIGURE 1.

Solvent-cast polyphenylene oxide films having low and relatively constant dissipation factors rendering them particularly useful in electrical capacitors such as that described above may be made, for example, by oxygenating a monohydric, monocyclic phenol in the presence of an oxygen-carrying intermediate solution comprising a tertiary amine-basic cupric salt complex, as disclosed and claimed more fully in application Ser. No. 212,128 (July 24, 1962)—Hay, now U.S. Patent 3,306,875 which is assigned to the same assignee as the present invention. This process is also generally disclosed in the Journal of Polymer Science, vol. 58 (1962), pp. 581–609 and 469–490. In this process, the self-condensation product of the phenols is removed from the reactant solution and dissolved in a solvent, usually a chlorinated organic solvent, such as chloroform. The solution is then spread or cast onto a flat surface, partially dried, stripped from the flat surface, and heated, sometimes under a reduced pressure, to an intermediate temperature to induce volatilization of substantially all of the remaining solvent.

The foregoing is the conventional method for producing solvent-cast polyphenylene oxide film. In accordance with the present invention, this polyphenylene oxide film is then heated to a temperature below the softening point of the film but substantially above the normal drying, or intermediate, temperature to remove residual solvent. It has been found that this subsequent treatment at high temperature reduces the dissipation factor of the film as well as the tendency of the dissipation factor to vary with changes in temperature or voltage imposed across the film. This result is attributed to the removal from the film of residual amounts of the solvent. In particular, it has been found that the subsequent heat treatment, as taught in this invention, causes a significant reduction in the amount of residual chlorine remaining in the film from the chlorinated organic solvent and it is thought that this reduction is the cause of the improved dielectric properties of the films of the present invention.

Other polyphenylene oxide materials, although produced by methods other than that described in the preceding paragraph, but nevertheless suitable for making solvent-cast film, may also be used to produce dielectric films having a low and relatively constant dissipation factor. The polyphenylene oxide is simply dissolved in an ordinary solvent, e.g., a chlorinated organic compound, cast onto a flat surface, partially dried, stripped from the casting surface, heated to an intermediate temperature sufficient to complete the drying process, and heated to a temperature substantially above the intermediate temperature but below the softening point of the film to remove residual solvent.

In accordance with the preferred embodiment of the present invention, a solution of polyphenylene oxide in chloroform is cast onto a flat surface, partially dried, removed from the casting surface, and heated with forced air at 100–125° C., preferably 100–100° C., for a period, generally 10–15 minutes, sufficient to remove substantially all of the chloroform. The film is then heated to 160–180° C. to remove residual solvent and to produce a dielectric film having a low and relatively constant dissipation factor which is particularly suitable for use as a dielectric spacer in electric capacitors.

The improved dielectric properties of solvent-cast polyphenylene oxide film, as disclosed herein, have been clearly demonstrated and in particular the reduced dissipation factor and reduced dependency of dissipation factor on voltage and temperature is readily apparent from tests of these variables, the results of which are graphically illustrated in FIGURES 2 and 3.

Referring specifically to FIGURE 2, the observer will first note Curve A, which shows the relationship between dissipation factor percent, measured at 60 cycles per second and 27° C. and voltage for a conventional solvent-cast polyphenylene oxide film. In order to obtain a more meaningful relationship, voltage is plotted as volts per mil thickness of the test film. Curve B, of FIGURE 2, shows the relationship between dissipation factor percent and volts per mil for the same film after it has been treated in accordance with the present invention. It will be noted that dissipation factor in the treated film is substantially lower than that of the untreated film at any given voltage and the slope of Curve B is also less than that of Curve A, indicating a reduced dependency of dissipation factor on voltage in the treated film as compared to the untreated film.

Although not illustrated, the reduced dissipation factor and reduced dependency of dissipation factor on voltage may be seen from data taken on three other samples of solvent-cast polyphenylene oxide film, before and after treatment in accordance with the present invention. This data is listed in Table I.

TABLE I

|  | Dissipation Factor Percent at 27° C. | |
|---|---|---|
|  | Before Treatment | After Treatment |
| Sample 1 (at 60 c.p.s.) | 0.205 | 0.070 |
| Sample 1 (at 100 c.p.s.) | 0.100 | 0.040 |
| Sample 2 (at 60 c.p.s.) | 0.105 | 0.072 |
| Sample 2 (at 100 c.p.s.) | 0.045 | 0.040 |
| Sample 3 (at 60 c.p.s.) | 0.160 | 0.062 |
| Sample 3 (at 100 c.p.s.) | 0.70 | 0.032 |

The effect of temperature on dissipation factor of chloroform-cast polyphenylene oxide film before and after treatment in accordance with the present invention may be seen in FIGURE 3. Curves C and D, in particular, indicate the dissipation factor, at 60 cycles per second, as two samples of conventionally produced, solvent-cast film are heated from 30° to 180° C. and then cooled back to 30° C. The cooling portion of these tests is represented by those parts of the curves designated as C' and D'. Curves E and F represent values of dissipation factor measured as a function of temperature after the samples have been thermocycled as illustrated by Curves C and C', and D and D'. Curves E and F demonstrate that the dissipation factor of these samples has been irreversibly lowered by the heat treatment at 180° C. and in addition that the dissipation factor of the treated film remains relatively constant as the films are heated to temperatures well above 180° C.

In summary, it can be seen that the heat treatment of solvent-cast polyphenylene oxide film at temperatures substantially above their normal drying temperatures, as taught in the present invention, has been amply demonstrated as a means for improving the dielectric properties of these films. In particular, it has been shown that dissipation factor has been irreversibly lowered by this treatment and the voltage and temperature dependency of dissipation factor in these films has been substantially eliminated.

While the present invention has been described with reference to particular embodiments thereof, it will be understood that numerous modifications may be made by those skilled in the art without departing from the true spirit and scope of the invention. Therefore, the appended claims are intended to cover all such equivalent variations as come within the true spirit and scope of the invention.

What I claim as new and desire to secure by Letters Patent of the United States is:

1. In a method for producing polyphenylene oxide film for use as a dielectric material by casting a chlorine containing solution of the polyphenylene oxide onto a flat surface and removing the solvent by partially drying the solution, stripping the film from the casting surface, and heating the film to an intermediate temperature so that substantially all of the solvent is removed, the improvement comprising heating the cast film thus produced to a higher temperature, substantially above the intermediate temperature but below the softening point of the film, to remove residual solvent and significantly reduce the dissipation factor of said film.

2. A process, as in claim 1, wherein said solvent is chloroform.

3. A process, as in claim 1, wherein said solvent is chloroform, said intermediate temperature is about 100–125° C. and said higher temperature is about 160°–180° C.

References Cited

UNITED STATES PATENTS 3,292,061 12/1966 Eustance _____ 317—258
3,306,875 1/1967 Hay.

FOREIGN PATENTS 694,995 7/1953 Great Britain.

LEWIS H. MYERS, *Primary Examiner.*

E. GOLDBERG, *Assistant Examiner.*